(12) United States Patent
Enomoto

(10) Patent No.: US 12,506,835 B1
(45) Date of Patent: Dec. 23, 2025

(54) TECHNIQUES FOR AUTOMATED CONTACT FLOW SIMULATION USING CONTACT TRACE RECORDS

(71) Applicant: State Farm Mutual Automobile Insurance Company, Bloomington, IL (US)

(72) Inventor: Dan Enomoto, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 155 days.

(21) Appl. No.: 18/423,068

(22) Filed: Jan. 25, 2024

(51) Int. Cl.
- H04M 3/00 (2024.01)
- H04M 3/22 (2006.01)
- H04M 3/523 (2006.01)

(52) U.S. Cl.
CPC ....... H04M 3/5232 (2013.01); H04M 3/2227 (2013.01)

(58) Field of Classification Search
CPC .. H04M 3/5232; H04M 3/2227; H04M 3/493; H04M 2207/30; G06F 11/36
See application file for complete search history.

(56) References Cited

U.S. PATENT DOCUMENTS

| | | | | |
|---|---|---|---|---|
| 6,922,466 B1 * | 7/2005 | Peterson | ........... | H04M 3/42221 379/265.06 |
| 8,009,811 B2 * | 8/2011 | Sharma | ................. | H04M 3/242 704/270 |
| 9,178,997 B2 | 11/2015 | Oristian | | |
| 9,628,613 B1 * | 4/2017 | Milroy | ................ | H04M 3/2227 |

OTHER PUBLICATIONS

AWS Marketplace, "Contact center testing, training, and monitoring with Bespoken," published online on Jul. 15, 2021, downloaded from https://aws.amazon.com/blogs/awsmarketplace/contact-center-testing-training-and-monitoring-with-bespoken/ on Jan. 24, 2024, 6 pages.

Bespoken, "Bespoken IVR Automation Overview" (presented as screenshots), published online Jan. 27, 2021, downloaded from https://www.youtube.com/watch?v=wizTBZrJ12Y on Jan. 24, 2024, 12 pages.

* cited by examiner

*Primary Examiner* — Rasha S Al Aubaidi
(74) *Attorney, Agent, or Firm* — Lee & Hayes, P.C.

(57) ABSTRACT

Techniques for simulating the logical flow of a contact center system without requiring user-provided contact instantiation are described herein. In some embodiments, a contact center simulation system is configured to map a contact flow of the contact center system to fields of a database and/or a contact trace record associated with a past contact instance. Based on this mapping data, the contact center simulation system may be configured to traverse the contact flow using programmatic input(s) corresponding to the inputs associated with a contact trace record. Through these simulations, the contact center simulation may identify one or more deficiencies associated with the contact center system without requiring any external inputs and without having access to the routing codebase of the contact center system.

20 Claims, 5 Drawing Sheets

TECHNIQUES FOR AUTOMATED CONTACT FLOW SIMULATION USING CONTACT TRACE RECORDS

TECHNICAL FIELD

The present disclosure relates to simulation systems, and more particularly to techniques for contact flow simulation.

BACKGROUND

Contact center systems handle high volumes of inbound contacts across phone, email, chat, social media, and/or other channels. Managing this demand requires sophisticated call routing systems and agent assignment logic to deliver responsive, personalized service. However, flaws or inefficiencies in the underlying contact workflows and/or routing logic can negatively impact operational efficiency and reliability of contact center systems.

Examples of the techniques described in the present disclosure are directed to overcoming the deficiencies noted above.

SUMMARY

In some examples, the techniques described herein relate to a computer-implemented method, including receiving, by a processor, a contact flow provided to a contact center system. The contact flow may represent a decision tree comprising a first node, a second node, and a third node. The first node may be configured to determine whether a first condition is satisfied, select a first routing path comprising the second node based on determining that the first condition is satisfied, and select a second routing path comprising the third node based on determining that the first condition is not satisfied. The second node may be configured to determine whether a second condition is satisfied. The method further comprises receiving, by the processor, a first trace record for a contact request provided to the contact center system. The method further comprises receiving, by the processor, mapping data that relates the first trace record to the contact flow. The method further comprises initializing, by the processor, a state variable to a first state representing the first node. The method further comprises determining, by the processor and based on the mapping data, a first value in the first trace record that corresponds to the first condition. The method further comprises determining, by the processor and based on the first value, that the contact request satisfies the first condition. The method further comprises updating, by the processor, the state variable to a second state representing the second node. The method further comprises determining, by the processor and based on the mapping data, a second value in the first trace record that corresponds to the second condition. The method further comprises determining, by the processor and based on the second value, a simulation output. The method further comprises determining, by the processor and based on the simulation output, that the contact flow contributes to a deficiency in a function performed by the contact center system.

In additional examples, the techniques described herein relate to a computing system, including a processor and memory storing computer-executable instructions that, when executed by the processor, cause the computing system to perform operations including receiving, by a processor, a contact flow provided to a contact center system. The contact flow may represent a decision tree comprising a first node, a second node, and a third node. The first node may be configured to determine whether a first condition is satisfied, select a first routing path comprising the second node based on determining that the first condition is satisfied, and select a second routing path comprising the third node based on determining that the first condition is not satisfied. The second node may be configured to determine whether a second condition is satisfied. The operations further comprise receiving a first trace record for a contact request provided to the contact center system. The operations further comprise receiving mapping data that relates the first trace record to the contact flow. The operations further comprise initializing a state variable to a first state representing the first node. The operations further comprise determining, based on the mapping data, a first value in the first trace record that corresponds to the first condition. The operations further comprise determining, based on the first value, that the contact request satisfies the first condition. The operations further comprise updating the state variable to a second state representing the second node. The operations further comprise determining, based on the mapping data, a second value in the first trace record that corresponds to the second condition. The operations further comprise determining, based on the second value, a simulation output. The operations further comprise determining, based on the simulation output, that the contact flow contributes to a deficiency in a function performed by the contact center system.

In further examples, the techniques described herein relate to one or more non-transitory computer-readable media storing computer-executable instructions that, when executed by the processor, cause the one or more processors to perform operations, including receiving, by a processor, a contact flow provided to a contact center system. The contact flow may represent a decision tree comprising a first node, a second node, and a third node. The first node may be configured to determine whether a first condition is satisfied, select a first routing path comprising the second node based on determining that the first condition is satisfied, and select a second routing path comprising the third node based on determining that the first condition is not satisfied. The second node may be configured to determine whether a second condition is satisfied. The operations further comprise receiving a first trace record for a contact request provided to the contact center system. The operations further comprise receiving mapping data that relates the first trace record to the contact flow. The operations further comprise initializing a state variable to a first state representing the first node. The operations further comprise determining, based on the mapping data, a first value in the first trace record that corresponds to the first condition. The operations further comprise determining, based on the first value, that the contact request satisfies the first condition. The operations further comprise updating the state variable to a second state representing the second node. The operations further comprise determining, based on the mapping data, a second value in the first trace record that corresponds to the second condition. The operations further comprise determining, based on the second value, a simulation output. The operations further comprise determining, based on the simulation output, that the contact flow contributes to a deficiency in a function performed by the contact center system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Techniques for simulating the logical flow of a contact center system without requiring user-provided contact instantiation are described herein. In some embodiments, a contact center simulation system is configured to map a contact flow of the contact center system to fields of a database and/or a contact trace record associated with a past contact instance. Based on this mapping data, the contact center simulation system may be configured to traverse the contact flow using programmatic input(s) corresponding to the inputs associated with a contact trace record. Through these simulations, the contact center simulation may identify one or more deficiencies associated with the contact center system without requiring any external inputs and without having access to the routing codebase of the contact center system.

Figure 1:
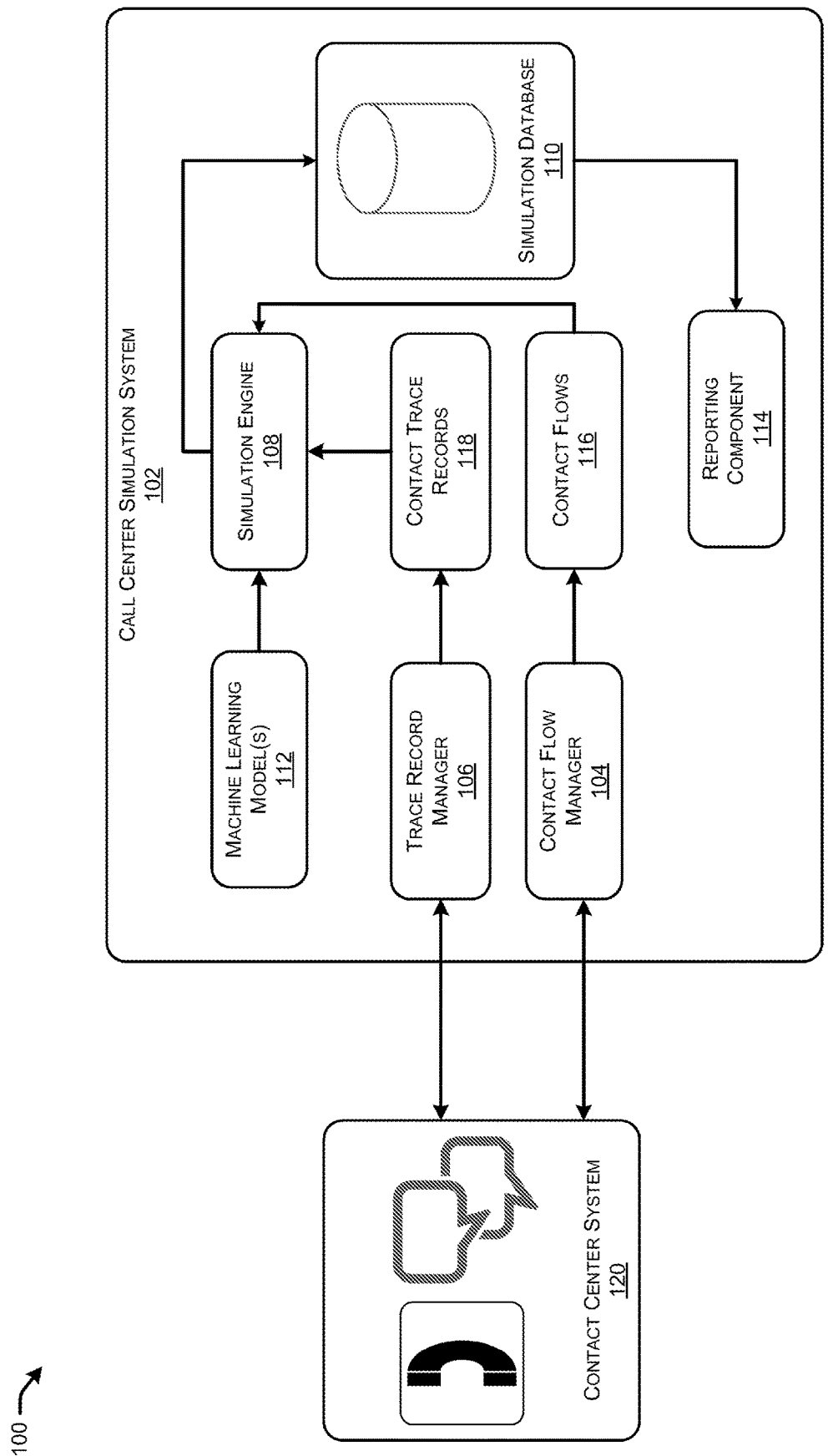
FIG. 1 depicts an environment for simulating the logical flow of a contact center system without requiring a user-initiated contact instance.

FIG. 1 depicts an environment 100 for simulating the logical flow of a contact center system 120 without requiring a user-initiated contact instance. As depicted in FIG. 1, the environment 100 includes the contact center system 120 and a contact center simulation system 102. As further depicted in FIG. 1, the contact center simulation system 102 includes a contact flow manager 104, a trace record manager 106, a simulation engine 108, a simulation database 110, one or more machine learning models 112, and a reporting component 114. In some embodiments, the contact center simulation system 102 lacks access to code data and/or configuration data associated with contact routing that is utilized by the contact center system.

The contact flow manager 104 may be configured to receive and/or process contact flows 116 provided by the contact center system 120. A contact flow may represent a predetermined workflow that defines contact routing decisions performed by the contact center system 120 based on contact attributes and/or interactions. The contact flow manager 104 may receive the contact flows 116 periodically and/or as those contact flows are updated or changed within the contact center system 120. A contact flow may be provided by an administrator user profile to the contact center system 120.

In some embodiments, a contact flow represents a decision tree with interlinked nodes. Some of the nodes associated with a contact flow may represent routing decisions, while other nodes associated with a contact flow may represent actions configured to place the call in a queue, direct the call to a specific agent (e.g., to a specific manual and/or automated agent), and/or terminate the call. For example, a contact flow may include a first decision node configured to evaluate whether a contact instance's requested service type matches "sales." A second decision node may depend from a "yes" branch of the first decision node. For example, the second decision node may evaluate whether a contact instance's account status is "premium." A first action branch may depend from a "yes" branch of the second decision node and a second action node may depend from a "no" branch of the second decision node. The first action node may route the contact instance to an agent, while the second action node may store an indication of the contact instance in a non-premium queue for limited routing to an agent. In general, a decision node of a contact flow may be configured to determine whether a condition is satisfied.

The contact flow manager 104 may parse the received contact flows 116 to identify the included nodes, the conditions and/or evaluations performed by each node, and the routing actions associated with each node. In some embodiments, the contact flow manager 104 may generate an internal data representation that relates the routing logic of a contact flow to configurable features that may be extracted from the contact trace records 118, as further described below.

For example, the contact flow manager 104 may determine that a first decision node of a contact flow relates to a "reason code field" field of a set of contact trace records associated with that contact flow. The contact flow manager 104 may further determine that a reason code value corresponds to a subtree of the contact flow that depends from the first decision node. The contact flow manager 104 may iteratively update mapping of fields and/or values associated with contact trace records to nodes, paths, transitions, portions, and/or subtrees of the contact flow.

The trace record manager 106 may be configured to receive and/or process the contact trace records 118 from the contact center system 120. The contact trace records 118 may represent historical records of contacts that have been processed by the contact center system 120 according to one or more contact flows 116. For example, each contact trace record may identify attributes of the associated contact, interactions that occurred during the contact, and routing actions performed by the contact center system 120 in response to those attributes and/or interactions.

In some embodiments, the trace record manager 106 processes the contact trace records 118 to generate a normalized data set. For example, the contact trace records 118 may include differently formatted data fields, incomplete information, and/or extraneous data. The trace record manager 106 may extract relevant contact attributes into a predefined set of fields. The trace record manager 106 may further clean up, reformat, and/or filter the contact trace record information to generate clean and consistent contact trace records for further simulation and analysis.

In some embodiments, the trace record manager 106 may map data fields and values from the normalized contact trace records to nodes, transitions between nodes, subtrees, and/or portions of the contact flows 116 generated by the contact flow manager 104. For example, the trace record manager 106 may determine data fields and/or values from a trace record that correspond to conditions evaluated and/or actions performed by specific nodes within the workflow logic of the contact flows 116.

In some embodiments, to map a contact flow to fields and/or values of a trace record, the trace record manager 106: (i) maps nodes of the contact flow to fields of a trace record, and (ii) maps edges of the contact flow to field values of a trace record. For example, the trace record manager 106 may determine that a contact flow node performs an evaluation that is determined based on the value corresponding to a field of a trace record. As another example, the trace record manager 106 may determine that a contact flow edge relates to the satisfaction of a condition defined based on a particular data value.

For example, given a contact flow with a node N1 that evaluates whether a contact instance is associated with an open case identifier, the trace record manager 106 may determine that node N1 relates to the case status field of the trace records. Further, the yes/no branch edges from node N1 relate to whether the case status field has a value of "open" or not.

As another example, a contact flow may have a node N2 that places gold customer contacts into a high priority queue. The trace record manager 106 maps node N2 to the account status field of the trace records. The trace record manager 106 also maps the edge propagating contacts from node N2 to the high priority queue based on the account status field having a "gold" value in the trace record.

In some embodiments, the trace record manager 106 may utilize the one or more machine learning models 112 to determine mappings between trace record fields and/or values and contact flow components. The machine learning models 112 may apply techniques such as regression analysis, pattern matching, classification models, and/or dimensionality reduction to align trace record attributes to contact flow features in an automated fashion. For example, a random forest model may identify correlations between trace record fields and internal branch points in the contact flows to determine mappings between contract trace record fields/values and segments (e.g., nodes or edges) of a contact flow.

The trace record manager 106 may receive one or more contact trace records 118 from the contact center system 120. A contact trace record may be a record of attributes and/or interactions associated with a user-initiated contact instance handled by the contact center system 120 according to the contact flows 116. The contact trace records 118 may represent how a specific contact instance progressed through the nodes and/or routing paths of the applicable contact flow.

In some embodiments, the trace record manager 106 receives streams or batches of contact trace records 118 periodically from the contact center system 120, such as on an hourly and/or daily basis. The trace record manager 106 may also obtain contact trace records 118 in real-time as specific contact instances are processed by the contact center system 120.

The trace record manager 106 may parse the obtained contact trace records 118 to extract relevant contact attributes and interaction data. Such data may include, for example, contact reason codes, interactive voice response (IVR) inputs, dialog turns, agent notes, disposition codes, outcome categories, call durations, wait time durations, and/or the like. The trace record manager 106 may store the parsed trace record data for simulation input, as further described below.

The simulation engine 108 may be configured to execute contact flow simulations using the processed contact flows 116 generated by the contact flow manager 104 and the parsed trace record data generated by the trace record manager 106. A contact flow simulation may include an algorithmic tracing of a contact flow 116 to simulate handling of a specific contact instance based directly on an associated contact trace record 118.

In some embodiments, a contact flow simulation includes a discrete event simulation that evaluates contact flow nodes and/or transitions associated with routing paths of a contact flow 116. This evaluation may be performed in an incremental fashion based on mappings of contract trace records fields/values and contact flow segments. The simulation may use such mapping data to relate data entities associated with a contact trace record to the segments of a contact flow (e.g., nodes and/or edges of a tree-based contact flow).

For example, if a first node in a contact flow evaluates whether a contact instance is associated with a sales-related reason code, the simulation engine 108 may map the first node to the reason code field of the trace record 118. Based on this mapping, the simulation engine 108 may retrieve the value of the reason code field and use the value to determine the simulated contact's service type for evaluating the condition. Based on the result, the simulation engine 108 may then transition a simulation state to a subtree of the contact flow tree that corresponds to the retrieved reason code value. The simulation engine 108 may thus mimic an expected behavior of the contact center system given the contact flow using programmatic, as opposed to user-provided, input (e.g., using arguments passed onto a simulation function).

The trace record manager 106 may map a segment (e.g., a node or edge) of a contact flow to a field that is stored on a database. In these cases, the simulation engine 108 may perform (e.g., using a stateless function, which may be a stateless compute resources to execute custom code/instructions) a database query operation if the related contact flow segment is activated during a contact flow traversal. In some embodiments, the information contained in the contact trace records 118 may originate from one or more databases associated with the contact center system 120. For example, customer account information, case details, and/or previous interaction history may be stored in various database tables used by the contact center system 120 for contact instance routing.

Accordingly, the trace record manager 106 may map a segment (e.g., a node or edge) of a contact flow to a field that is stored on a database associated with the contact center system 120. For example, a contact flow node checking account status tiers may map to a database table storing full account details joined across customer, billing, and plan details in the production system databases. During simulation, the simulation engine 108 may perform database query operations if the related contact flow segments are activated during a simulated contact flow traversal. For example, when executing a node that evaluates account status, the simulation engine 108 may use a stateless function to query the mapped database tables and return an account status value to simulate the real account lookup behavior. This allows the simulation environment to use not only user-provided values but also dynamically retrieved values during call routing simulations.

In some embodiments, the trace record manager 106 uses a metadata store to track mappings between contact flow components and data sources. An entry within the metadata store may specify a node identifier or edge identifier from a parsed contact flow graph. This contact flow segment identifier may map to one or more database queries defined in the metadata store. For example, a contact node may map to both a customer information database query and an account status database query. In some embodiments, the simulation engine 108 utilizes these defined mappings when traversing a simulated contact flow path. After reaching a mapped node or edge segment during a simulation, the simulation engine 108 executes the corresponding database queries defined in the metadata store. In some embodiments, the simulation engine 108 leverages stateless functions to perform the database queries. For example, a mapped account validation node may trigger the simulation engine 108 to call a "GET_ACCOUNT_STATUS" stateless function deployed in the simulation environment.

In some embodiments, if a node of a contact flow is mapped to a value stored on a database, the simulation engine 108 performs a database query operation (e.g., using a stateless function) even when the value may be available on the contact trace record being used to guide the simulation. The objective behind this implementation may be to model the real-world system behavior more accurately. By essentially "replaying" the database access side-effects that accompany core call routing decision points, the simulation may gain increased insights into system behavior.

In some embodiments, the contact flows 116 handled by the contact center system 120 may include IVR nodes that prompt for and process user-provided voice inputs. For example, a contact flow may capture a user-provided voice input from a caller and convert the input to text to determine a language selection. To simulate nodes with voice input processing, the simulation engine 108 may map processed voice inputs to categorical selections and/or text phrases. The simulation engine 108 may then simulate a contact instance associated with a contact trace record by programmatically providing the categorical selection in response to the IVR node. In some embodiments, to simulate nodes with voice input processing, the simulation engine 108 may utilize pre-recorded or generated speech samples to provide voice inputs to IVR nodes. For example, the simulation engine 108 may provide a synthesized voice input saying "English" in response to an IVR node seeking a vocal utterance with a language selection.

To initialize a contact flow simulation instance, the simulation engine 108 may set a state variable to represent an entry node in the contact flow 116. An iteration of the simulation analysis may then include updating the state variable to the subsequent node based on the mapping data, a contact trace record, and/or any values retrieved from a database. At each node, the simulation engine 108 may: (i) retrieve mapping data that maps the node to a contact trace record field, and (ii) perform an evaluation associated with the node based on a data value of the contact trace record that corresponds to the contact trace record field. The mapping and evaluation steps may repeat node-by-node as the simulation traverses the contact flow 116.

In some embodiments, executing the contact flow simulations as described above enables identifying contact flow inefficiencies without requiring user-provided inputs and/or user-initiated contact instances. For example, the simulation engine 108 may detect that the contact flow of the contact center system contributes to a deficiency based on detection of a circular and/or endless routing loop during simulated traversal of the contact flow. As another example, the simulation engine 108 may detect that the contact flow of the contact center system has a deficiency based on detection of a mismatch between a contact instance type and an ultimately selected service queue during simulated traversal of the contact flow.

For example, the simulation engine 108 may detect that a contact flow: (i) directs a gold-tier customer call to a premium support queue, (ii) if a gold-tier customer call is in the premium support queue for a first threshold time period, directs the gold-tier customer call to a general queue, and (iii) if a gold-tier customer call is in the general queue, directs the gold-tier customer call to the premium queue. This circular behavior may represent a deficiency associated with the implemented contact flow. As another example, during simulation, the simulation engine 108 may determine that a contact flow: (i) directs a completed call to a post-call survey, and (ii) if the post-call survey shows an unresolved issue, directs the call to an agent queue. This behavior may indicate a deficiency because the contact flow places a call in an agent queue at the end of the call and without an explicit user request to speak to an agent. As another example, the simulation engine 108 may determine that a contact flow places a call associated with a sales question in a customer support queue. This mismatch between the call reason and the placement queue type may indicate a deficiency associated with the corresponding contact flow.

In some embodiments, the simulation engine 108 uses one or more machine learning models 112 to perform the contact flow simulations. The machine learning models 112 may include trained models configured to predict contact instance routing metrics and/or outcomes based on contact instance features. For example, the machine learning models 112 may predict at least one of the following for a contact instance: wait-time, total time, satisfaction of the contact instance initiator (e.g., the caller), a number of selections and/or inputs provided by the initiator, and/or the like. For example, a machine learning model may be configured to determine, based on one or more features associated with a call request being simulated (e.g., based on one or more features represented by the request's corresponding contact trace record and/or by data associated with the request as retrieved from a target database), a wait-time associated with placement of the request on a queue. The wait-time may then be used as a measure to determine a metric associated with the call. For example, the simulation engine can aggregate total wait times across many simulated calls to calculate average speed of answer metrics for different contact types and routing paths. As another example, a machine learning model may estimate caller satisfaction based on simulated call features. Lower predicted satisfaction scores may indicate suboptimal experiences due to excessive transfers, long handle times, unintuitive prompts, and/or other deficiencies in the underlying contact flow design.

In some embodiments, the simulation engine 108 uses one or more reinforcement learning models to iteratively adjust feature data associated with a simulated contact instance to maximize discovered issues and/or suboptimal conditions. For example, a reinforcement learning agent may modify simulated contact reason codes to deliberately trigger edge case routing paths not well covered by historical contact trace records. By intelligently varying inputs, the simulation engine can expand analysis from replay of past logs to proactive discovery of potential future problems. For example, after simulating a sales contact being properly routed to a sales queue, the reinforcement learning model may alter the contact reason to a technical support code on the next simulation. If this subsequent simulation routes the contact instance to the billing queue instead of technical support queue, this erroneous routing may reveal a potential contact flow deficiency. Accordingly, in some embodiments, a reinforcement model guides the simulation engine 108 through adversarial generation of corner case inputs aimed at stress testing and ultimately improving the contact flow logic.

The reporting component 114 may process records of the contact flow simulations executed by the simulation engine 108 to identify deficiencies associated with the contact flows associated with the contact center system 120. In some embodiments, the reporting component 114 scans simulation histories to detect circular routing loops, mismatches between initial contact reasons and terminating service queues, failing nodes, unused nodes, dormant nodes, and/or the like. The reporting component 114 may generate summaries, annotations, visualizations, alerts, and/or recommendations based on the simulation analyses. In some embodiments, the reporting component 114 provides an interface for an administrative user to inspect detailed simulation histories for specific simulated contact instances.

Accordingly, as described herein, after the contact flow manager 104 receives and parses a contact flow, the trace record manager 106 generates mapping data. The mapping data may map a segment of the contact flow to at least one of: (i) one or more fields and/or values of a contact trace record associated with a past contact instance, (ii) one or more fields and/or values stored on a database (e.g., on a remote database), and/or (iii) one or more categorical values (e.g., a value selected from a categorical space defining a set of categories). For example, the trace record manager 106 may determine that a first node of the contact flow performs an evaluation based on a data field of a contact trace record, a second node of the contact flow performs an evaluation based on a data field stored on a database, and a third node of the contact flow performs an evaluation based on a user-provided unstructured input (e.g., user-provided audio input) that indicates a categorical selection (e.g., a language selection). After the trace record manager 106 generates the mapping data, the simulation engine 108 uses the mapping data along with a contact trace record to simulate a contact instance. For example, the simulation engine 108 may: (i) simulate the evaluation of a first node associated with a first field by providing a value recorded in the contact trace record in relation to the first field as an input for the evaluation, (ii) simulate the evaluation of a second node associated with a second field by providing a value stored in a database in relation to the second field as an input for the evaluation, and/or (iii) simulate the evaluation of a third node associated with a third field by determining a categorical selection associated with the unstructured data corresponding to the third field and providing the categorical selection as an input to the evaluation. After the simulation engine 108 performs the simulation based on the mapping data, the simulation engine 108 may determine one or more metrics (e.g., loop metrics, wait-time metrics, and/or the like) associated with the simulation (e.g., by using the machine learning models). The simulation engine 108 may store the simulation metrics and/or records of simulation events on the simulation database 110. The reporting component 114 may then determine whether the contact center system 120 is associated with any contact flow deficiencies based on the metrics and/or event records stored on the simulation database 110.

In some embodiments, the contact center simulation system 102 enables detecting one or more deficiencies associated with the contact center system 120. For example, the contact center simulation system 102 may be configured to detect that the contact flow logic of the contact center system 120 includes loops and/or mismatched queue placement schemes. As another example, the contact center simulation system 102 may be configured to detect that the contact center system 120 is associated with excessive wait-times. By determining predictive insights about one or more deficiencies associated with the contact center system 120, the contact center simulation system 102 may enable performing remedial actions to address the deficiencies. Accordingly, by detecting one or more deficiencies associated with the contact center system 120, the contact center simulation system 102 improves operational reliability of the contact center system 120.

In some embodiments, the contact center simulation system 102 enables simulating at least some of the operations associated with the contact center system 120 using synthetic inputs, as opposed to user-provided inputs. This reduces and/or removes the need for establishing user-initiated contacts (e.g., user-initiated calls) during simulation operations associated with the contact center simulation system 102. By removing the need for use of resources (e.g., network resources) for establishing user-initiated contacts (e.g., user-initiated calls) during simulation operations associated with the contact center simulation system 102, the contact center simulation system 102 improves efficiency and reduces operational load of performing simulated testing of the contact center system 120.

In some embodiments, the contact center simulation system 102 enables removing loops from the control logic of the contact center system 120. Loops may cause substantial overhead for the computational and/or network resources of the contact center system 120. By removing loops from the control logic of the contact center system 120, the contact center simulation system 102 may reduce the overhead associated with such loops. Accordingly, contact center simulation system 102 improves efficiency and reduces operational load of performing operations associated with the contact center system 120.

Figure 2:
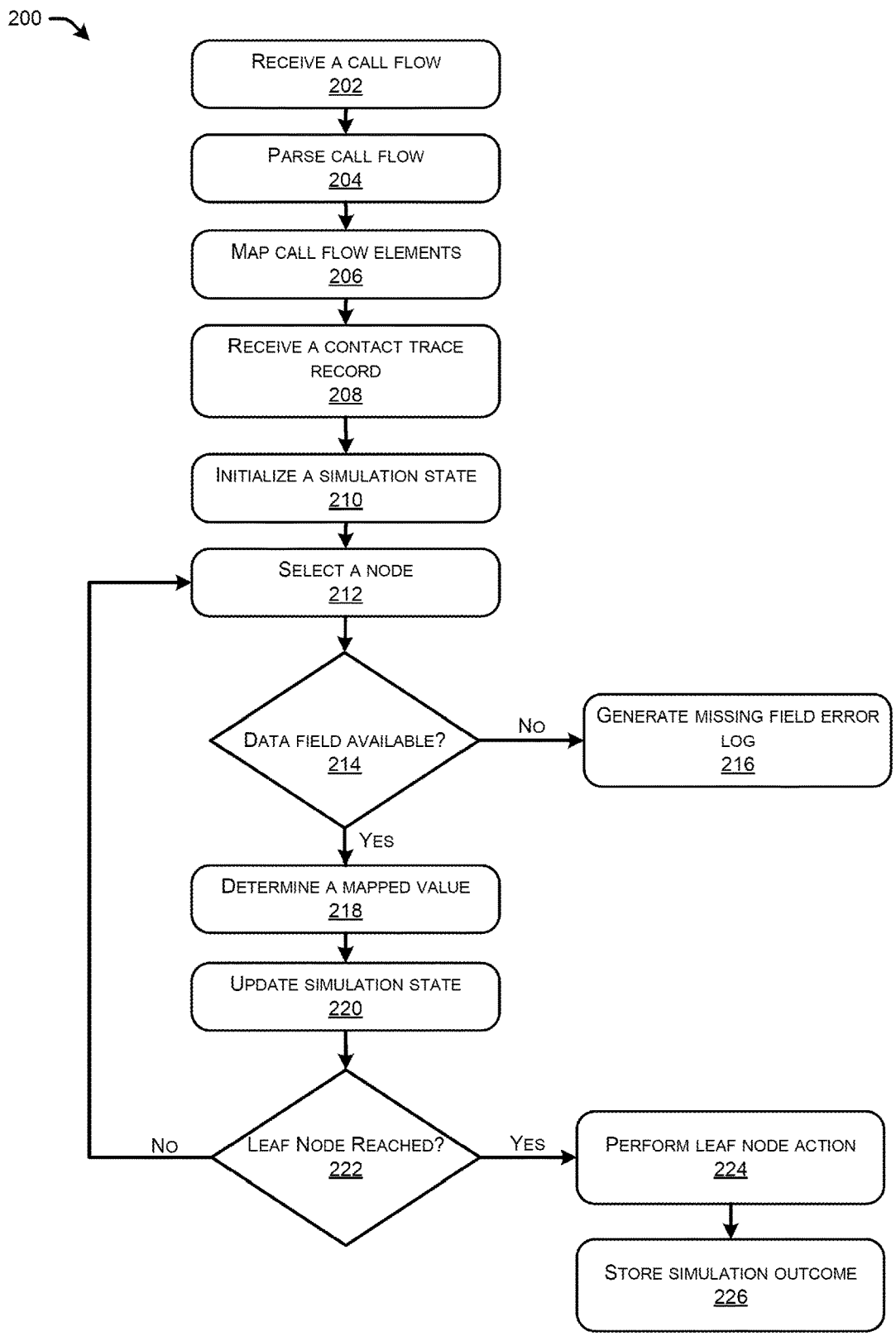
FIG. 2 is a flowchart diagram of an example process for performing simulated testing of the contact center system.

FIG. 2 is a flowchart diagram of an example process 200 for performing simulated testing of the contact center system 120. As depicted in FIG. 2, at operation 202, the contact flow manager 104 receives a contact flow from the contact center system 120. A contact flow may represent a predetermined workflow that defines contact routing decisions performed by the contact center system 120 based on contact attributes and/or interactions. The contact flow may have nodes corresponding to decisions (e.g., evaluations) and/or nodes corresponding to actions (e.g., queue placement actions).

At operation 204, the contact flow manager 104 parses the contact flow into nodes and edges. In some embodiments, an internal node of the contact flow represents a decision performed during the contact flow, a leaf node of the contact flow represents an action performed at the end of the contact flow, and/or an edge of a contact flow represents that the result of a decision performed at one node may conditionally lead to traversal of another node. In some embodiments, the contact flow manager 104 parses the contact flow by mapping a decision block to an internal node, a terminal action to a leaf node, a conditional relationship between a decision block and a terminal action using a leaf edge, and a conditional relationship between a decision block and another decision block using an internal edge.

At operation 206, the trace record manager 106 maps each parsed contact flow node or edge to a data field, a data value, or an operation. In some embodiments, the trace record manager 106 may map an internal node of the contact flow to a data field, such as a data field associated with the schema of a contact trace record or a data value stored on a database (e.g., on a remote database). In some embodiments, the trace record manager 106 may map a leaf node of the contact flow to an operation, such as a queue placement operation and/or an operation associated with prediction of a wait-time associated with placement of a simulated contact instance on a queue. In some embodiments, the trace record manager 106 may map an edge of the contact flow that is directed from a particular node to a potential data value of the data field that corresponds to the particular node. For example, the trace record manager 106 may map an internal node related to a reason code selection to a selected reason code data field, a leaf node related to queue placement to an operation associated with prediction of a wait time related to a sales queue, and an edge from the internal node to the leaf node with the reason code value "sales."

At operation 208, the simulation engine 108 receives a contact trace record. The contact trace record may represent a set of features (e.g., a set of user-provided features) associated with a past historical contact instance (e.g., a historical call). The trace record manager 106 may receive the contact trace record from the contact center simulation system 102.

At operation 210, the simulation engine 108 initializes a simulation state. The simulation state may represent a state of traversal of the contact flow during a particular simulation associated with a particular contact trace record. The initial simulation state may be set to indicate a root node (e.g., an entry node) associated with the contact flow.

At operation 212, the simulation engine 108 selects a node of the contact flow based on the simulation state. During the initial simulation iteration, the selected node may be set to the root node. During subsequent simulation iteration(s), the selected node may be set based on traversal(s) performed in prior iteration(s).

At operation 214, the simulation engine 108 determines whether a data field mapped to the selected node is available. For example, if the data field is mapped to a data field of a contact trace record, the simulation engine 108 may determine whether the contact trace record received at operation 208 includes a value (e.g., a non-null value) corresponding to the mapped field. For example, if the data field is mapped to a data field of a target database, the simulation engine 108 may determine whether the target database includes a value (e.g., a non-null value) corresponding to the data field in relation to the contact trace record (e.g., in relation to a customer identifier represented by the contact trace record).

If the simulation engine 108 determines that the mapped data field is unavailable (operation 214—No), the system proceeds to operation 216 to terminate the simulation. The simulation engine 108 may generate an error log noting that the contact flow requires a field that is not available in at least one contact trace record.

If the simulation engine 108 determines that the mapped data field is available (operation 214—Yes), the system proceeds to operation 218 to determine a value corresponding to the mapped data field. Operation 218 may be performed, for example, based on the techniques described below in relation to FIG. 3. For example, if the data field is mapped to a data field of a contact trace record, the simulation engine 108 may determine the value associated with the mapped data field based on the corresponding value represented by the contact trace record. As another example, if the data field is mapped to a data field of a target database, the simulation engine 108 may determine the value associated with the mapped data field based on the corresponding value stored on the target database.

At operation 220, the simulation engine 108 updates the simulation state based on the determined value. The simulation engine 108 may determine which edge of the contact flow is activated by the determined value and update the simulation state to a node of the contact flow to which the edge is directed to. For example, if the determined value is English for a language selection node, the simulation engine 108 may update the state to the node resulting from selection of English in relation to the language selection node.

At operation 222, the simulation engine 108 determines whether the node represented by the simulation state is a leaf node of the contact flow. If the simulation engine 108 determines that whether the node represented by the simulation state is a leaf node of the contact flow (operation 222—Yes), the simulation engine 108 may perform an action associated with the leaf node at operation 224 and store the simulation outcome at operation 226. A leaf node may correspond to a terminal action performed at the end of the contact flow. An example of a terminal action is a queue placement action. The terminal action may be associated with a wait-time prediction operation. The wait-time prediction operation may include using a trained machine learning model to determine a wait-time associated with a contact instance based on one or more features associated with that instance. The wait-time prediction may be stored as part of the simulation outcomes associated with the simulation.

If the simulation engine 108 determines that whether the node represented by the simulation state is not a leaf node of the contact flow (operation 222—No), the simulation engine 108 may return to operation 212 to repeat another simulation iteration, but this time based on the updated simulation state as updated at operation 220. This iterative process may continue until the traversal reaches a leaf node and/or a terminal action.

Accordingly, the process 200 enables traversing a contact flow based on a contact trace record until the contact flow reaches a terminal state. Using these traversal techniques, the process 200 enables simulating a past contact instance without requiring a user-initiated contact.

Figure 3:
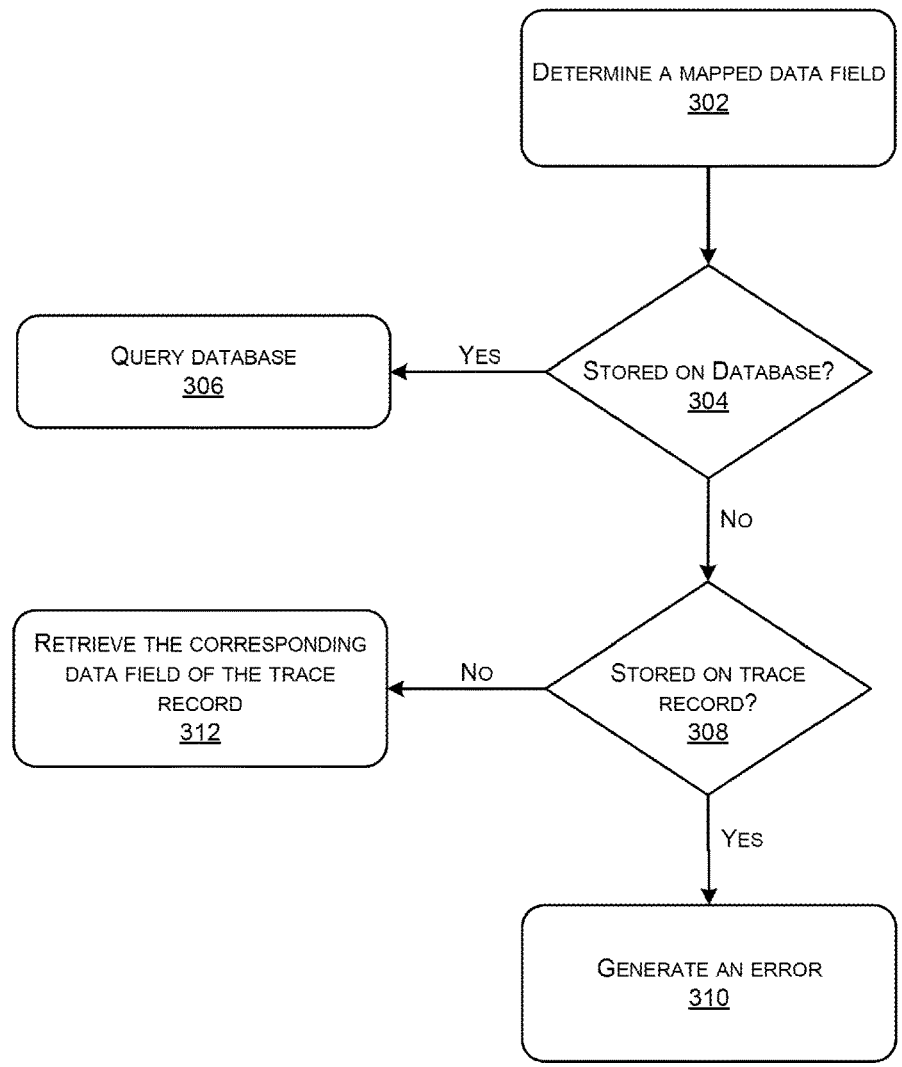
FIG. 3 is a flowchart diagram of an example process for determining a data value associated with a contact flow node.

FIG. 3 is a flowchart diagram of an example process 300 for determining a data value associated with a contact flow node. As depicted in FIG. 3, at operation 302, the trace record manager 106 determines a data field mapped to the contact flow node. The data field may be represented by the metadata associated with the contact flow and/or may be automatically determined based on comparing one or more attributes (e.g., a name) of the data field to one or more attributes (e.g., textual data) associated with the contact flow node. For example, if the contact flow node is associated with the term "English or Spanish?," the trace record manager 106 may map the contact flow node to a language selection field of a schema associated with a contact trace record.

At operation 304, the trace record manager 106 determines whether the mapped data field is stored on a database. If the trace record manager 106 determines that the mapped data field is stored on a database (operation 304—Yes), the trace record manager 106 proceeds to operation 306 to query the database to retrieve a value associated with the data field. In some embodiments, the trace record manager 106 uses a stateless function to query the database to retrieve the mapped data field. For example, the trace record manager 106 may query a database to obtain a customer's account status. If the trace record manager 106 determines that the mapped data field is not stored on a database (operation 304—No), the trace record manager 106 proceeds to operation 308.

At operation 308, the trace record manager 106 determines whether the mapped data field corresponds to a data field associated with the schema of a contact trace record. For example, the trace record manager 106 may determine that the mapped data field is a language selection field associated with the schema of the contact trace record. If the trace record manager 106 determines that the mapped data field does not correspond to a data field associated with the schema of the contact trace record (operation 308—No), the trace record manager 106 proceeds to operation 310 to generate an error indicating that the mapping of the contact flow node is erroneously performed. However, if trace record manager 106 determines that the mapped data field corresponds to a data field associated with the schema of the contact trace record (operation 308—Yes), the trace record manager 106 proceeds to operation 312 to determine the data value corresponding to the mapped data field as represented by the contact trace record.

Accordingly, the process 300 enables using mappings of contact flow nodes (e.g., internal contact flow nodes) to determine data values associated with the contact flow nodes. The data value associated with a contact flow node may enable performing the decision and/or evaluation associated with the contact flow node. Therefore, process 300 enables traversal of a contact flow as part of simulating a past contact instance without requiring a user-initiated contact.

Figure 4:
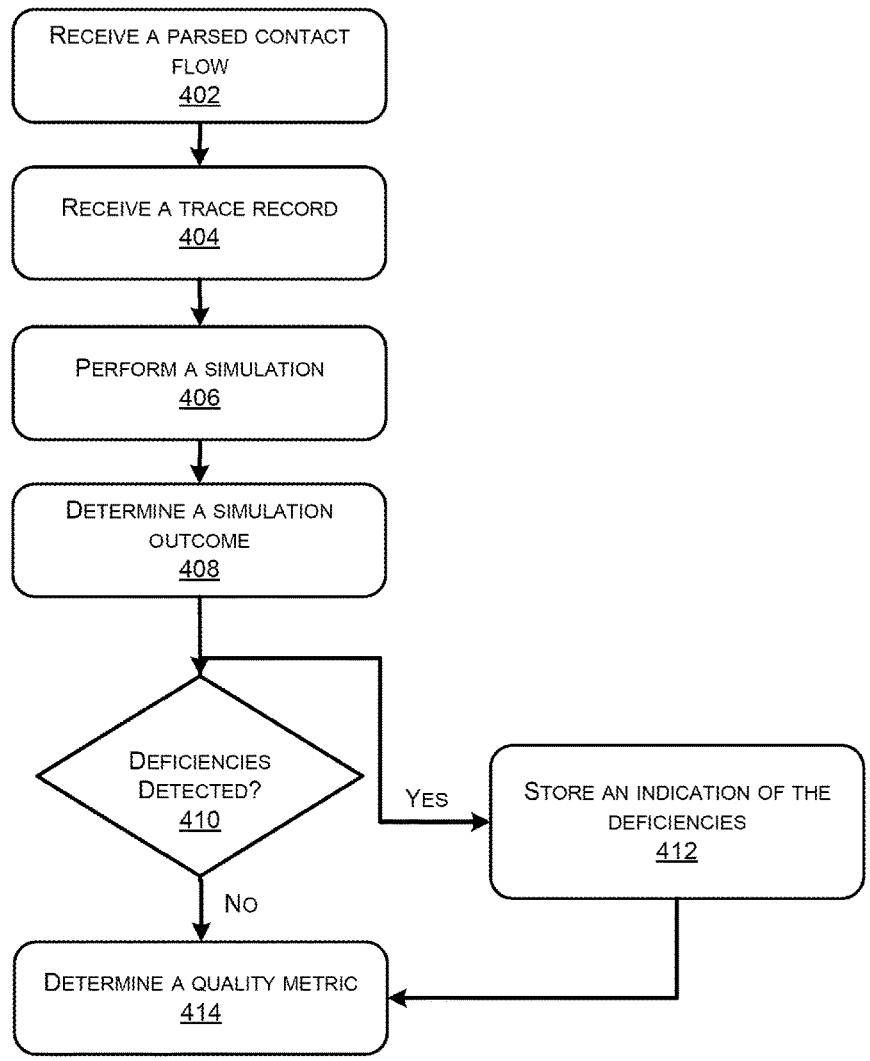
FIG. 4 is a flowchart diagram of an example process for determining a deficiency associated with the contact center system using simulated testing.

FIG. 4 is a flowchart diagram of an example process 400 for determining a deficiency associated with the contact center system 120 using simulated testing. As depicted in FIG. 4, at operation 402, the simulation engine 108 receives a parsed contact flow. Parsing a contact flow may be performed using the techniques described above. The simulation engine 108 may receive the parsed contact flow from the contact flow manager 104.

At operation 404, the simulation engine 108 receives a contact trace record. The contact trace record may represent a set of features (e.g., a set of user-provided features) associated with a past historical contact instance (e.g., a historical call). The trace record manager 106 may receive the contact trace record from the contact center simulation system 102.

At operation 406, the simulation engine 108 performs a simulation based on the contact trace record and the contact flow. The simulation engine 108 may traverse the contact flow based on the contact trace record. Operation 406 may be performed using the techniques described herein for traversing a contact flow, such as the techniques described above in relation to FIG. 2.

At operation 408, the simulation engine 108 determines a simulation outcome. The simulation outcome may represent one or more events and/or one or more metrics associated with the simulation. For example, the simulation outcome may represent input values performed during the simulation, nodes traversed during the simulation, total call time determined by the simulation, total wait time determined by the simulation, and a leaf node traversed by the simulation.

At operation 410, the simulation engine 108 determines whether the simulation outcome represents any deficiencies in the control flow logic. For example, the simulation engine 108 may detect that the contact flow of the contact center system has a deficiency based on detection of a circular and/or endless routing loop during simulated traversal of the contact flow. As another example, the simulation engine 108 may detect that the contact flow of the contact center system has a deficiency based on detection of a mismatch between a contact instance type and an ultimately selected service queue during simulated traversal of the contact flow.

If the simulation engine 108 determines that the simulation outcome represents any deficiencies (operation 410—Yes), the simulation engine 108 proceeds to operation 412 to store an indication of the determined deficiencies on the simulation database 110. Afterward, the simulation engine 108 proceeds to operation 414. The deficiencies may be presented to an administrator user profile using an administrator user interface platform. If the simulation engine 108 determines that the simulation outcome does not represent any deficiencies (operation 410—No), the simulation engine 108 proceeds to operation 414.

At operation 414, the simulation engine 108 determines a quality metric for the simulated contact instance. The quality metric may be represented based on the metrics determined at operation 410. A quality metric for the simulated contact instance may represent at least one of a wait-time, processing time, number of required user inputs, number of repetitive steps, conversion rate, ultimate resolution result, customer satisfaction score, agent satisfaction score, or compliance to service level agreements.

Accordingly, the process 400 enables using a contact trace record associated with a past contact instance and a contact flow of the contact center system 120 to simulate routing operations of the contact center system 120. Therefore, process 400 enables traversal of a contact flow as part of simulating a past contact instance without requiring a user-initiated contact.

Figure 5:
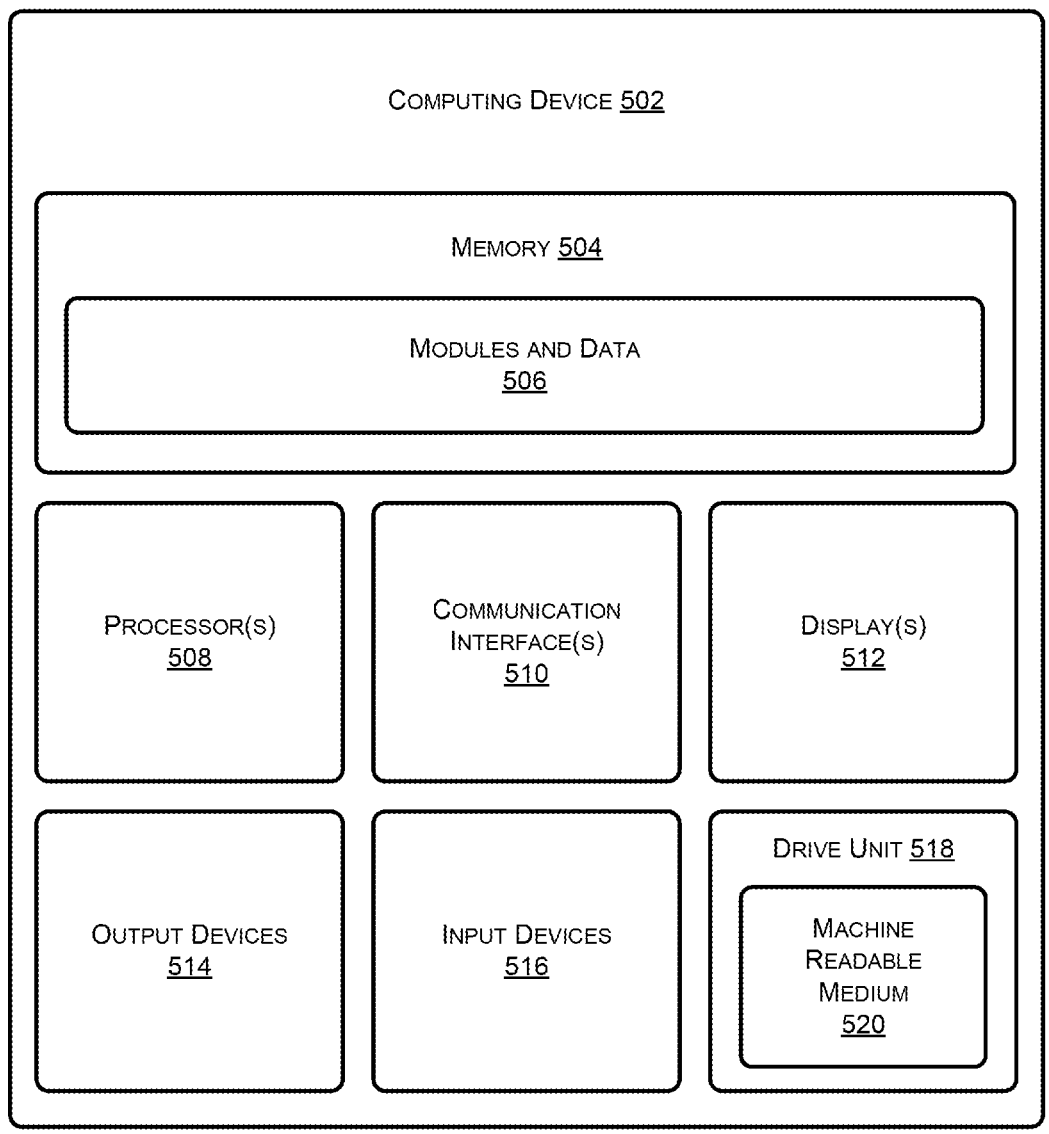
FIG. 5 shows an example system architecture for a computing device associated with an environment described herein.

FIG. 5 shows an example system architecture for a computing device 502 associated with the environment 100 described herein. A computing device 502 can be a server, computer, or other type of computing device that executes at least a portion of the environment 100. In some examples, elements of the environment 100 can be distributed among, and/or be executed by, multiple computing devices 502.

A computing device 502 can include memory 504. In various examples, the memory 504 can include system memory, which may be volatile (such as RAM), non-volatile (such as ROM, flash memory, etc.) or some combination of the two. The memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media.

Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 502 associated with the environment 100. Any such non-transitory computer-readable media may be part of the computing devices 502. The memory 504 can include modules and data 506 needed to perform operations of one or more computing devices 502 of the environment 100.

One or more computing devices 502 of the environment 100 can also have processor(s) 508, communication interfaces 510, displays 512, output devices 514, input devices 516, and/or a drive unit 518 including a machine readable medium 520.

In various examples, the processor(s) 508 can be a central processing unit (CPU), a graphics processing unit (GPU), both a CPU and a GPU, or any other type of processing unit. Each of the one or more processor(s) 508 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 508 may also be responsible for executing computer applications stored in the memory 504, which can be associated with common types of volatile (RAM) and/or nonvolatile (ROM) memory.

The communication interfaces 510 can include transceivers, modems, interfaces, antennas, telephone connections, and/or other components that can transmit and/or receive data over networks, telephone lines, or other connections.

The display 512 can be a liquid crystal display or any other type of display commonly used in computing devices. For example, a display 512 may be a touch-sensitive display screen and can then also act as an input device or keypad, such as for providing a soft-key keyboard, navigation buttons, or any other type of input.

The output devices 514 can include any sort of output devices known in the art, such as a display 512, speakers, a vibrating mechanism, and/or a tactile feedback mechanism. Output devices 514 can also include ports for one or more peripheral devices, such as headphones, peripheral speakers, and/or a peripheral display.

The input devices 516 can include any sort of input devices known in the art. For example, input devices 516 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 520 can store one or more sets of instructions (e.g., a set of computer-executable instructions), such as software or firmware, that embodies any one or more of the methodologies or functions described herein. The instructions can also reside, completely or at least partially, within the memory 504, processor(s) 508, and/or communication interface(s) 510 during execution thereof by the one or more computing devices 502 of the environment 100. The memory 504 and the processor(s) 508 also can constitute machine readable media 520. The instructions may cause the processor(s) 508 to perform operations described in this document.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
    receiving, by a processor, a contact flow provided to a contact center system, wherein:
        the contact flow represents a decision tree comprising a first node, a second node, and a third node,
        the first node is configured to determine whether a first condition is satisfied, select a first routing path comprising the second node based on determining that the first condition is satisfied, and select a second routing path comprising the third node based on determining that the first condition is not satisfied, and
        the second node is configured to determine whether a second condition is satisfied;
    receiving, by the processor, a first trace record for a contact request provided to the contact center system;
    receiving, by the processor, mapping data that relates the first trace record to the contact flow;
    initializing, by the processor, a state variable to a first state representing the first node;
    determining, by the processor and based on the mapping data, a first value in the first trace record that corresponds to the first condition;
    determining, by the processor and based on the first value, that the contact request satisfies the first condition;
    updating, by the processor, the state variable to a second state representing the second node;
    determining, by the processor and based on the mapping data, a second value in the first trace record that corresponds to the second condition;
    determining, by the processor and based on the second value, a simulation output; and
    determining, by the processor and based on the simulation output, that the contact flow contributes to a deficiency in a function performed by the contact center system.

2. The method of claim 1, wherein:
    the first condition is defined based on an unstructured user input,
    the unstructured user input comprises at least one of a voice input or an unstructured text input,
    the mapping data relates the unstructured user input to a categorical space, and
    the categorical space defines a plurality of categories comprising a first category corresponding to the first value.

3. The method of claim 1, wherein:
    the second node is further configured to select a third routing path comprising a fourth node based on determining that the second condition is satisfied;
    the fourth node is configured to determine whether a third condition is satisfied; and
    the method further comprises:
        determining, by the processor, that the contact request satisfies the second condition;
        determining, by the processor, that a third value corresponding to the third condition is stored on a database; and
        executing, by the processor, a stateless function to retrieve the third value from the third condition.

4. The method of claim 1, wherein:
    the second node is further configured to select a third routing path comprising a fourth node based on determining that the second condition is satisfied;
    the fourth node is configured to select a fourth routing path comprising a waiting queue placement; and
    the method further comprises:
        determining, by the processor, that the contact request satisfies the second condition; and
        executing, by the processor, a stateless function to determine an estimated wait time based on a feature associated with the contact request.

5. The method of claim 4, wherein the stateless function comprises processing the feature using a machine learning model trained based on a second trace record provided by the contact center system.

6. The method of claim 4, wherein the feature represents a contact request priority for the contact request.

7. The method of claim 1, wherein the simulation output represents whether the contact flow comprises a loop.

8. The method of claim 1, wherein the simulation output represents whether the contact flow represents a mismatch between a contact request type for the contact request and a routing decision type.

9. The method of claim 1, wherein:
    the processor lacks access to configuration data for the contact center system, and
    the configuration data comprises an instruction for routing a second contact instance in accordance with the contact flow.

10. A computing system, comprising:
a processor; and
memory storing computer-executable instructions that, when executed by the processor, cause the computing system to perform operations comprising:
receiving a contact flow provided to a contact center system, wherein:
the contact flow represents a decision tree comprising a first node, a second node, and a third node,
the first node is configured to determine whether a first condition is satisfied, select a first routing path comprising the second node based on determining that the first condition is satisfied, and select a second routing path comprising the third node based on determining that the first condition is not satisfied, and
the second node is configured to determine whether a second condition is satisfied;
receiving a first trace record for a contact request provided to the contact center system;
receiving mapping data that relates the first trace record to the contact flow;
initializing a state variable to a first state representing the first node;
determining, based on the mapping data, a first value in the first trace record that corresponds to the first condition;
determining, based on the first value, that the contact request satisfies the first condition;
updating the state variable to a second state representing the second node;
determining, based on the mapping data, a second value in the first trace record that corresponds to the second condition;
determining, based on the second value, a simulation output; and
determining, based on the simulation output, that the contact flow contributes to a deficiency in a function performed by the contact center system.

11. The computing system of claim 10, wherein:
the first condition is defined based on an unstructured user input,
the unstructured user input comprises at least one of a voice input or an unstructured text input,
the mapping data relates the unstructured user input to a categorical space, and
the categorical space defines a plurality of categories comprising a first category corresponding to the first value.

12. The computing system of claim 10, wherein:
the second node is further configured to select a third routing path comprising a fourth node based on determining that the second condition is satisfied;
the fourth node is configured to determine whether a third condition is satisfied; and
the operations further comprise:
determining that the contact request satisfies the second condition;
determining that a third value corresponding to the third condition is stored on a database; and
executing a stateless function to retrieve the third value from the third condition.

13. The computing system of claim 10, wherein:
the second node is further configured to select a third routing path comprising a fourth node based on determining that the second condition is satisfied;
the fourth node is configured to select a fourth routing path comprising a waiting queue placement; and
the operations further comprise:
determining that the contact request satisfies the second condition; and
executing a stateless function to determine an estimated wait time based on a feature associated with the contact request.

14. The computing system of claim 13, wherein the stateless function comprises processing the feature using a machine learning model trained based on a second trace record provided by the contact center system.

15. The computing system of claim 13, wherein the feature represents a contact request priority for the contact request.

16. One or more non-transitory computer-readable media storing computer-executable instructions that, when executed by a processor, cause the processor to perform operations, comprising: receiving a contact flow provided to a contact center system, wherein:
the contact flow represents a decision tree comprising a first node, a second node, and a third node,
the first node is configured to determine whether a first condition is satisfied, select a first routing path comprising the second node based on determining that the first condition is satisfied, and select a second routing path comprising the third node based on determining that the first condition is not satisfied, and
the second node is configured to determine whether a second condition is satisfied;
receiving a first trace record for a contact request provided to the contact center system;
receiving mapping data that relates the first trace record to the contact flow;
initializing a state variable to a first state representing the first node;
determining, based on the mapping data, a first value in the first trace record that corresponds to the first condition;
determining, based on the first value, that the contact request satisfies the first condition;
updating the state variable to a second state representing the second node;
determining, based on the mapping data, a second value in the first trace record that corresponds to the second condition;
determining, based on the second value, a simulation output; and
determining, based on the simulation output, that the contact flow contributes to a deficiency in a function performed by the contact center system.

17. The one or more non-transitory computer-readable media of claim 16, wherein:
the first condition is defined based on an unstructured user input,
the unstructured user input comprises at least one of a voice input or an unstructured text input,
the mapping data relates the unstructured user input to a categorical space, and
the categorical space defines a plurality of categories comprising a first category corresponding to the first value.

18. The one or more non-transitory computer-readable media of claim 16, wherein:
the second node is further configured to select a third routing path comprising a fourth node based on determining that the second condition is satisfied;

the fourth node is configured to determine whether a third condition is satisfied; and the operations further comprise:
- determining that the contact request satisfies the second condition;
- determining that a third value corresponding to the third condition is stored on a database; and
- executing a stateless function to retrieve the third value from the third condition.

19. The one or more non-transitory computer-readable media of claim 16, wherein:

the second node is further configured to select a third routing path comprising a fourth node based on determining that the second condition is satisfied;

the fourth node is configured to select a fourth routing path comprising a waiting queue placement; and the operations further comprise:
- determining that the contact request satisfies the second condition; and
- executing a stateless function to determine an estimated wait time based on a feature associated with the contact request.

20. The one or more non-transitory computer-readable media of claim 19, wherein the stateless function comprises processing the feature using a machine learning model trained based on a second trace record provided by the contact center system.

\* \* \* \* \*